United States Patent
Varillas et al.

(10) Patent No.: US 10,731,569 B2
(45) Date of Patent: Aug. 4, 2020

(54) SYSTEMS AND METHODS FOR INJECTION OF BIO-DIESEL INTO A GAS TURBINE COMBUSTOR

(71) Applicant: General Electric Company, Schenectady, NY (US)

(72) Inventors: Gerardo F. Varillas, Greenville, SC (US); Rohit Mohinder Sharma, Bangalore (IN); Richard Epley, Greenville, SC (US); Sheng Jia Zheng, Greenville, SC (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 14/884,321

(22) Filed: Oct. 15, 2015

(65) Prior Publication Data

US 2017/0107913 A1    Apr. 20, 2017

(51) Int. Cl.
*F02C 9/42*    (2006.01)
*F02C 9/40*    (2006.01)
(Continued)

(52) U.S. Cl.
CPC ................. *F02C 9/42* (2013.01); *F02C 3/04* (2013.01); *F02C 6/00* (2013.01); *F02C 7/22* (2013.01);
(Continued)

(58) Field of Classification Search
CPC ...... F02C 9/26; F02C 9/28; F02C 9/40; F02C 9/42; F02C 3/04; F02C 3/30; F02C 6/00;
(Continued)

(56) References Cited

U.S. PATENT DOCUMENTS 3,943,372 A  *  3/1976  Smith .................... F01D 19/00
                                                      290/40 R
7,458,998 B2    12/2008  Copeland et al.
(Continued)

FOREIGN PATENT DOCUMENTS

DE    102012209566 A1    12/2013
EP        2716890 A2     4/2014
WO    2011024191 A2     3/2011

OTHER PUBLICATIONS

European Search Report and Opinion issued in connection with related European Application No. 16193420.3 dated Feb. 23, 2017.
(Continued)

*Primary Examiner* — Mark A Laurenzi
*Assistant Examiner* — Loren C Edwards
(74) *Attorney, Agent, or Firm* — Eversheds Sutherland (US) LLP

(57) ABSTRACT

Certain embodiments may include systems and methods that comprise a first unit controller associated with a first gas turbine and a second unit controller associated with a second gas turbine. A first unit human machine interface is coupled to the first unit controller and is operable to provide first blend information to the first unit controller. Additionally, a second unit human machine interface is coupled to the second unit controller and is operable to provide second blend information to the second unit controller. A splitter panel, coupled to the first unit controller and the second unit controller, is operable to transfer control of a plurality of common skids between the first unit controller and the second unit controller. The transfer of control may occur by toggling a plurality of relays housed in the splitter panel. A plurality of common skids is operable to provide biofuel to a plurality of injection skids. The plurality of common skids may comprise a heating skid, a filtration skid, and a pumping (Continued)

skid shared by the first gas turbine and the second gas turbine.

20 Claims, 4 Drawing Sheets

(51) Int. Cl.
- *F02C 7/228* (2006.01)
- *F02C 3/04* (2006.01)
- *F02C 6/00* (2006.01)
- *F02C 7/22* (2006.01)
- *F23R 3/28* (2006.01)

(52) U.S. Cl.
CPC ............... *F02C 7/228* (2013.01); *F02C 9/40* (2013.01); *F23R 3/28* (2013.01); *F05D 2220/32* (2013.01); *F05D 2240/35* (2013.01); *F05D 2270/54* (2013.01)

(58) Field of Classification Search
CPC .. F02C 7/22; F02C 7/224; F02C 7/228; F02C 7/236; F23R 3/28; F05D 2220/32; F05D 2240/35; F05D 2270/54; F02D 41/0025; Y02T 10/36

USPC .................................................. 60/39.21, 772
See application file for complete search history.

(56) References Cited

U.S. PATENT DOCUMENTS

| | | |
|---|---|---|
| 2004/0188360 A1 | 9/2004 | Armstrong et al. |
| 2005/0061749 A1 | 3/2005 | Bennett et al. |
| 2010/0170266 A1* | 7/2010 | Dinu .................... F02C 3/20 60/787 |
| 2010/0187818 A1 | 7/2010 | Bivins et al. |
| 2014/0096827 A1* | 4/2014 | Scipio .................. F02C 9/40 137/1 |
| 2015/0119611 A1 | 4/2015 | Ball et al. |

OTHER PUBLICATIONS

European Search Report and Opinion issued in connection with corresponding European Application No. 16193422.9 dated Mar. 8, 2017.

* cited by examiner

SYSTEMS AND METHODS FOR INJECTION OF BIO-DIESEL INTO A GAS TURBINE COMBUSTOR

TECHNICAL FIELD

This disclosure generally relates to gas turbines, and in particular to systems and methods for injection of bio-diesel into a gas turbine combustor.

BACKGROUND

Gas turbines burn fuel, typically natural gas or distillate oil, to produce rotary motion in a turbine. However, interest in using biofuels as fuel in the generation of electricity has increased significantly due to rising oil prices and concerns over the possible environmental impacts caused by fossil fuel use.

Existing dual liquid fuel designs rely on a mixing chamber or a storage tank to perform the blending of the biofuel and distillate. These designs typically require separate mixing chambers for each unit. Even if the system is modified to feed multiple units, the blend ratio will be the same in all units. Additionally, changing the blend ratio will be slow because the time required is proportional to the volume of mixing chamber or storage tank. Furthermore, these designs generally do not have provisions to purge the biofuel lines with distillate. Stagnant biofuel in the lines downstream of the pumps up to and including the mixing chamber can gel in cold temperature, and this volume can be significant.

BRIEF DESCRIPTION OF THE DISCLOSURE

Some or all of the above needs may be addressed by certain embodiments of the disclosure. According to an example embodiment, there is disclosed a system for injecting biofuel into a gas turbine system. The system can include a first unit controller associated with a first gas turbine and a second unit controller associated with a second gas turbine. A first unit human machine interface is coupled to the first unit controller and is operable to provide first blend information to the first unit controller. Additionally, a second unit human machine interface is coupled to the second unit controller and is operable to provide second blend information to the second unit controller. A splitter panel, coupled to the first unit controller and the second unit controller, is operable to transfer control of a plurality of common skids between the first unit controller and the second unit controller. The transfer of control may occur by toggling a plurality of relays housed in the splitter panel. A plurality of common skids is operable to provide biofuel to a plurality of injection skids. The plurality of common skids may comprise a heating skid, a filtration skid, and a pumping skid shared by the first gas turbine and the second gas turbine.

According to yet another embodiment of the disclosure, there is disclosed a method for injecting biofuel into a gas turbine system. The method can include receiving first blend information associated with a first gas turbine and receives second blend information associated with a second gas turbine. The method can further provide commands to a plurality of common skids that provide a first blend of biofuel to the first gas turbine and a second blend of biofuel to the second gas turbine, wherein the commands are provided by a controlling control panel. The method can also update a non-controlling panel with the commands issued by the controlling control panel. This enables transferring the control of the plurality of common skids from the controlling control panel to the non-controlling control panel. The method can also provide the first blend to the first gas turbine concurrently with the second blend to the second gas turbine.

Other embodiments, features, and aspects of the disclosure are described in detail herein and are considered a part of the claimed disclosure. Other embodiments, features, and aspects can be understood with reference to the following detailed description, accompanying drawings, and claims.

BRIEF DESCRIPTION OF THE FIGURES

References will now be made to the accompanying figures, which are not necessarily drawn to scale, and wherein.

These implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Example embodiments of the disclosure now will be described more fully hereinafter with reference to the accompanying drawings, in which some, but not all embodiments are shown. Indeed, the disclosure may be embodied in many different forms and should not be construed as limited to the embodiments set forth herein; rather these embodiments are provided so that this disclosure will satisfy applicable legal requirements.

Figure 1:
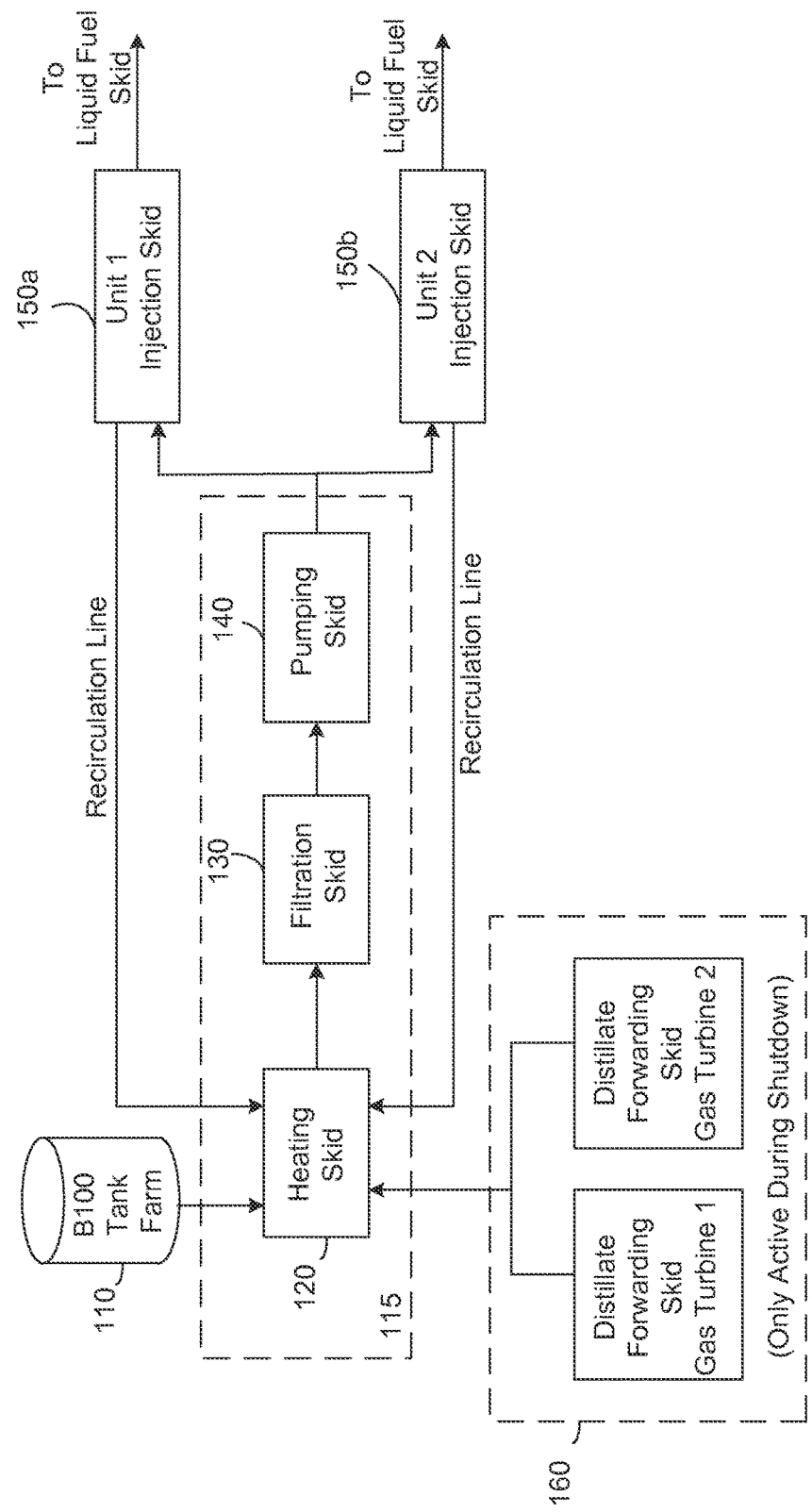
FIG. 1 is a schematic block diagram of an exemplary system architecture for injection of bio-diesel into a gas turbine combustor according to certain embodiments of the disclosure.

FIG. 1 depicts an exemplary biofuel injection architecture 100 that can allow a gas turbine to burn a biodiesel-distillate mixture up to a B20 biofuel blend ratio. The system architecture 100 may include a heating skid 120, self-cleaning filtration skid 130, pumping skid 140, and injection skids 150a, 150b. The heating 120, self-cleaning 130, and pumping 140 skids (aka common skids 115) can be shared between two gas turbines.

The biofuel is not premixed with distillate; therefore it may be stored as B100 in a tank 110 prior to entering the heating skid 120. The biofuel layout 100 may have a heating skid 120 to prevent the biofuel from gelling during usage. Each gas turbine may have its own corresponding biofuel injection skid 150a, 150b that ties into their liquid fuel skid. The injection skid 150a, 150b regulates the flow of biofuel by observing the distillate flow rate to meet the required blend ratio. Injecting biofuel to create a blend, as opposed to blending fuel in a mixing chamber, can, in certain instances, eliminate the need for the mixing tanks creating significant financial savings and can create a more competitive product.

When not in use, the biofuel system 200 can enter a relatively long term shutdown mode. Biofuel generally is not injected during gas turbine startup and shutdown. During an active shutdown, the biofuel system 200 may be operated with just distillate via the distillate forwarding skids 160. Running on pure distillate can clean out the system of biofuel and can avoid leaving stagnant biofuel after shutdown that can gel in the piping. This purge process can remove the biofuel from the piping by burning the leftover biofuel. At least one technical effect of certain embodiments of the disclosure is eliminating the need to waste the fuel during a purge.

As shown in FIG. 1, this new arrangement allows injection of any desired blend of bio-diesel, such as B10 or B20, online without the use of a mixing tank. This arrangement has the flexibility to vary the individual biofuel injection rates in single or multiple gas turbine delivery units. A customer burn different blend ratios (B5, B10, B15, B20) with distillate instead of pre-blending the fuel. This biofuel architecture 100 provides much greater flexibility with the biofuel usage rate.

Figure 2:
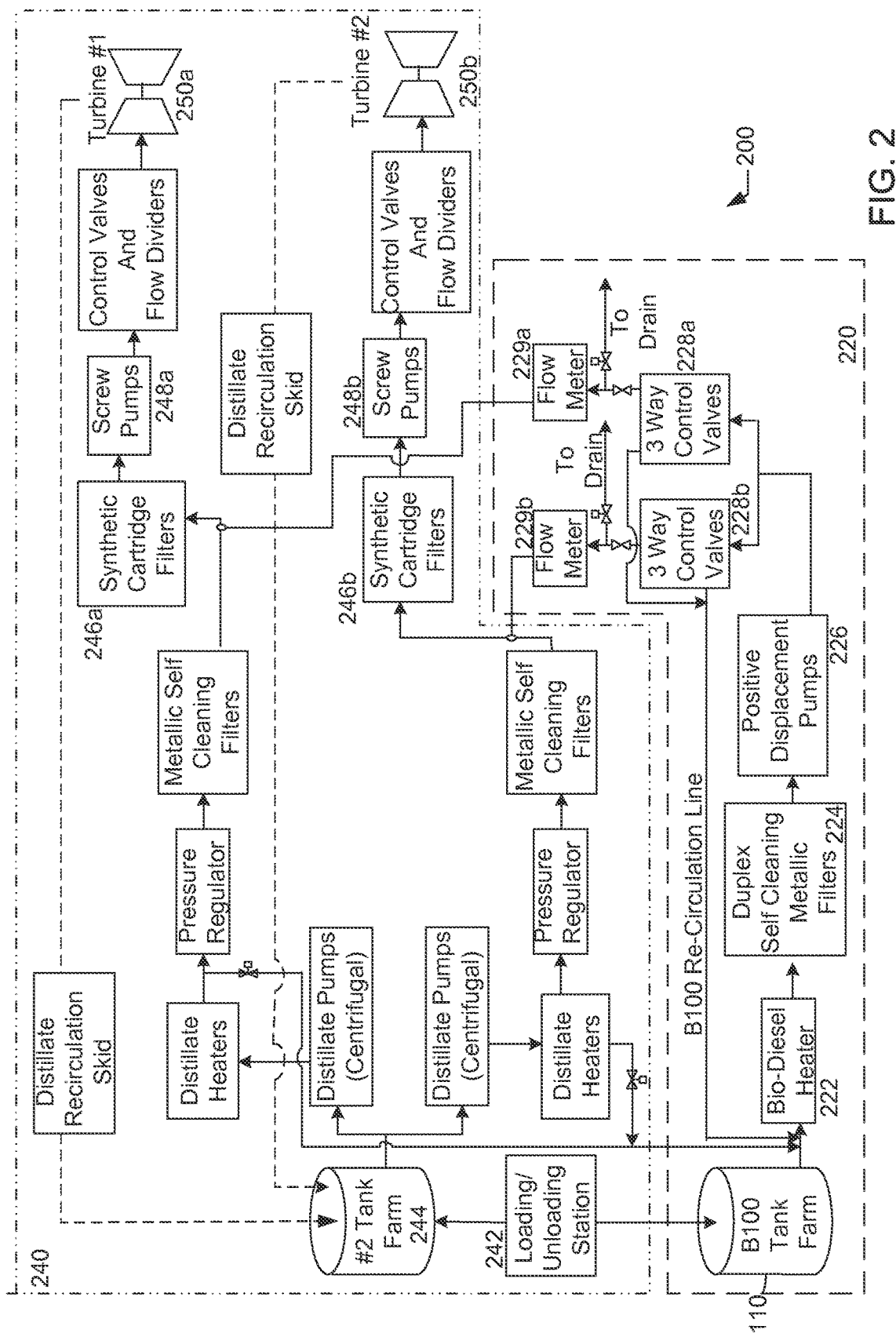
FIG. 2 is a schematic block diagram of an exemplary detailed biofuel system according to certain embodiments of the disclosure.

Turning now to FIG. 2, depicted is an exemplary detailed biofuel system 200. The biofuel system 200 depicted can provide biofuel for two gas turbines 250a, 250b simultaneously or for either one. One skilled in the art will recognize that the present system 200 may be utilized for three or more units. The biofuel injection system 220 can tie into the existing gas turbine system 240 before the synthetic cartridge filters 246a, 246b on that particular unit's liquid fuel skid. The biofuel is not premixed with distillate and may be stored as B100 in a tank 110 prior to the bio-diesel heater 222. The distillate may be stored in its separate tank farm 244. An unloading station 242 may provide easy access to the distillate tank farm 244 and B100 tank 110.

The biofuel B100 can be unloaded into a biofuel tank 110. After leaving the biofuel tank 110, the biofuel flows into a bio-diesel heater 222, through duplex self self-cleaning metallic filters 224, and through positive displacement pumps 226 prior to entering an injection skid 150. The amount of biofuel injection can be regulated by a three way control valve 228a, 228b and metered by the flow meter 229a, 229b in the injection skid 150a, 150b. The regulated biofuel can flow into the suction side of the screw pumps 248a, 248b. The screw pumps 248a, 248b can provide the necessary mixing of the distillate and the biofuel. At least one technical effect of certain embodiments of the disclosure is that the biofuel injection rate can be changed in real time to change the blend entering into the gas turbine system 240.

When not in use, the biofuel injection system 220 may be placed in a shutdown mode. In this mode, the biofuel injection system 220 can be filled with distillate to avoid leaving stagnant biofuel to gel in the piping. The distillate can enter the biofuel injection system 220 prior to the biofuel heater 222 on biofuel heating skid 120. This process can clean out the common biofuel injection skids. During the shutdown process, the biofuel/distillate mixture may be burnt off while it is being replaced with distillate. At least one unit should be operable for this process to occur. Otherwise, the biofuel injection system can be purged via a drain system. Over time, the concentration of biofuel in the skids can decrease and may become negligible. At least one technical effect of certain embodiments of the disclosure is eliminating the need to waste the fuel during a purge.

Figure 3:
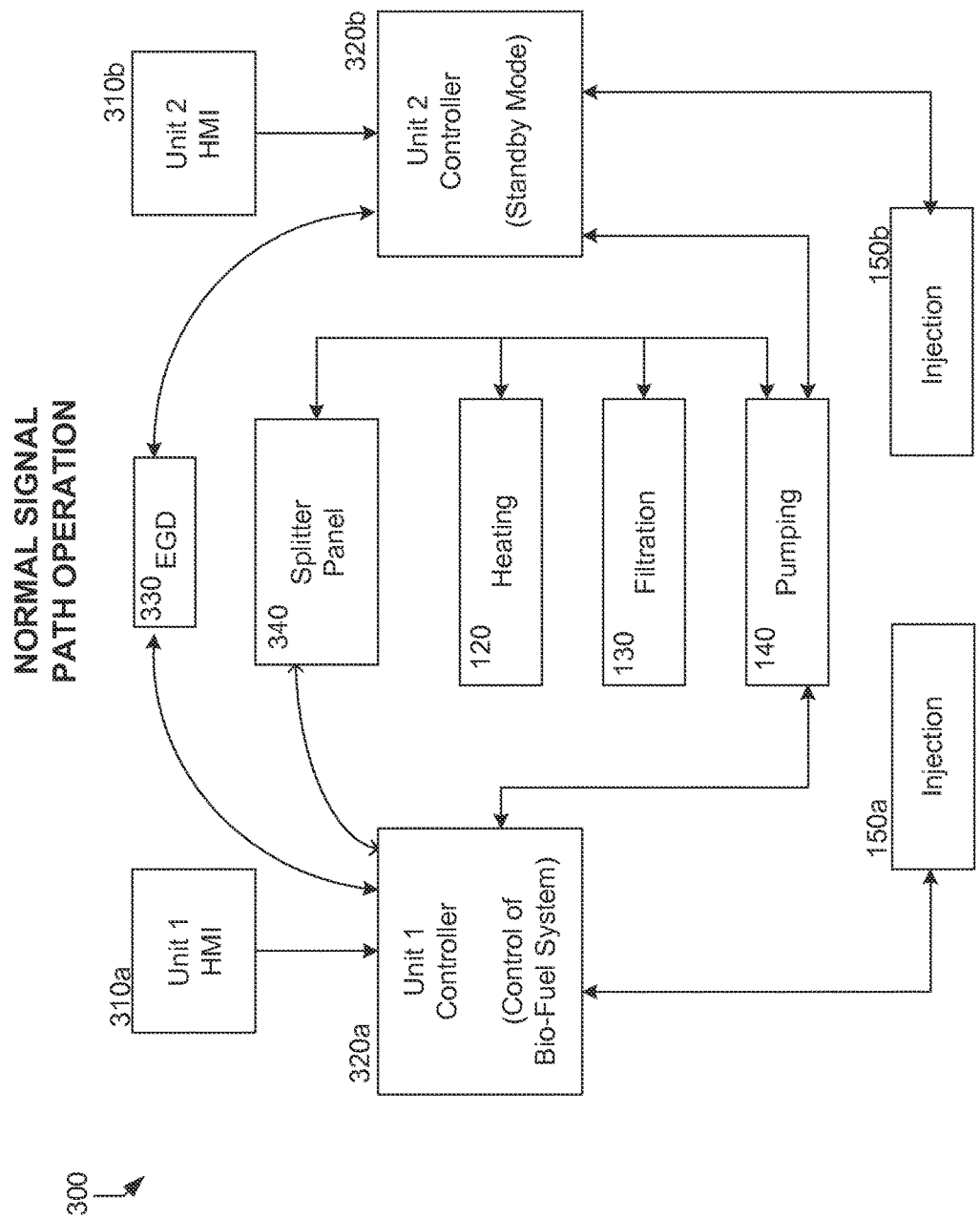
FIG. 3 is a schematic block diagram of an exemplary signal path for the normal operation of the biofuel injection system according to certain embodiments of the disclosure.

FIG. 3 depicts an exemplary signal path 300 for the normal operation of the biofuel injection system 220. The controls software may be designed to allow the customer to inject up to B20 on liquid fuel operation. The software may be constantly monitoring the operation parameters to ensure some or all safety limits are met before and while injecting biofuel. In some instances, any critical component failure may result in an automatic shutdown of the biofuel system without interfering with the regular gas turbine operation on liquid fuel.

The software may also allow two control panels 320a, 320b (Unit 1 and Unit 2) to control the common skids 115 (heating 120, filtration 130, and pumping 140) shared between the two gas turbines 250a, 250b. At any time, the turbine panel 320 controlling the common skids 115 can be switched to the other unit. At least one technical effect of certain embodiments of the disclosure enables the biofuel operation to continue during start up or shutdown of the other unit.

During the biofuel injection system 220 startup, all of the manual valves should be closed. All three pumps on the pump skid 140 should be off and the biofuel injection stop valves should be closed. Once the recirculation permissives are met, the biofuel injection system 220 can enter the recirculation mode using the recirculation line shown in FIG. 2. The recirculation mode permissive list can include comprises both manual distillate valves closed, manual biofuel valve open, no biofuel lockout, bypass valve in full recirculation, injection stop valve closed, and pump suction above minimum pressure. In this mode, pump #3 may be on to recirculate the biofuel/distillate mixture. At this point, the biofuel system can either enter the energy saving mode or the injection mode. If the injection permissives are met, then the unit can start injecting biofuel in the biofuel system 200.

The injection permissive may include signals that a unit is producing above a set megawatt limit, biofuel is at correct temperature, no biofuel lockout, a unit is on total liquid fuel, 2 out of 3 pumps are not at fault, forced recirculation performed, and injection valve 228 and flow meter 229 are operational. When injection is selected, the pump 226 swap process may occur before the bypass valves start to open.

The shutdown process may need at least one gas turbine 250 to be able to inject biofuel. The "purge mode" may be initiated by clicking on the "shut down" button located in the injection HMI (human machine interface) screen 310, when in recirculation mode. This may shut off the pumps and wait for at least one of the two manual distillate valves to indicate open along with closing the manual biofuel valve. During the shutdown process, the biofuel/distillate mixture may be burnt off while it is being replaced with distillate. Over time, the concentration of biofuel in the skids should decrease. After injecting the biofuel/distillate mixture for a set period (for example 30 minutes), the software may automatically turn off everything for "long term shut down".

A splitter panel 340 may be incorporated into the biofuel injection system 220 to allow either turbine control panels 320a, 320b to control the common skids 115 and be able to transfer the control. This can allow the two controllers 320a, 320b to operate in parallel to control the common skids 115 for redundancy and control of common skids 115 can be transferred while units are operating. The hardware may be configured so that different skids 120, 130, 140 may be added or removed to accommodate different fuel requirements. Therefore, modular sections may be created for each skid in the software.

In one embodiment, up to seven tasks may be created under the biodiesel program. The first two tasks "PushButtons" and "IODefExch" may be created for processing signals. The "PushButtons' task may receive screen commands via the HMI 310 and convert them into internal software signals. A purpose of "IODefExch" may be to determine if the software set will receive its hardware signals through the splitter panel 340 or EGD (Ethernet Global Data service) 330. The remaining five tasks may be related to the biofuel operation of the skids. The "CmdStatus' task may contain the logic for the overall operation and protection on biofuel. This may include determining which biofuel mode is active. The last four tasks may contain the skid level logic. The Software in Unit 2 may be duplicated from Unit 1.

To seamlessly transfer the control of the common skids 115 between two TCPs (turbine control panels) 320a, 320b, the biofuel software in both controllers 320 should be running in parallel. When Unit 1 controller 320a is in control of the common skids 115, the splitter panel 340 may direct all of the hardware IOs to TCP #1320a. Unit 2 controller 320b may receive all of the IO points from EGD 330. When a command is sent from Unit 1 HMI 310a Screen for the common biofuel skids 115, Unit 1 controller 320a may receive it directly and process the command. The same command may be sent to Unit 2 controller 320b through EGD 330 and it also may perform the same task but hardware commands may be contained in that controller 320b, however, Unit 2 controller 320b may receive feedback from the common skids 115 to prevent an alarm being generated. For example, if Unit 1 controller 320a issues a command to open a valve, Unit 2 controller 320b may issue the same command but since Unit 1 is in control the splitter panel 340 may send the command from Unit 1 controller 320a. The protection logic may call for the signal to drop out which indicates the valve is not closed. This signal may be sent back to TCP #1320a through the splitter panel 340 to prevent a faulty valve alarm being generated. The same is true for Unit 2, but since the splitter panel 340 is directing all of the hardware IOs to Unit 1, the signal may be received by Unit 2 through EGD 330 from Unit 1.

Some or all of the hardware IO signals being utilized in "CmdStatus' may have SEL (Schweitzer Engineering Laboratories) attached to the original signal name. This is done so that regardless if the copy of "CmdStatus is in Unit 1 or Unit 2, it operates the same. For example, during Unit 1 in control "IODefExch" may feed the actual hardware signals from the splitter panel 340 into the SEL signals. On Unit 2. "IODefExch" may feed the EGD 330 hardware signals into the SEL signals. This is done so regardless of which unit is in control "CmdStatus' will operate the same and this task can be kept identical between the two controllers.

Since the two software sets are running in parallel there is sometimes the risk of them becoming unsynchronized. This issue can be mitigated by ensuring both controllers 320 have the same biofuel software version and control constants. For additional protection, both controllers 320 are capable of detecting synchronicity. If synchronicity isn't detected, then the software can prevent the transfer of the common skid 115 control. To resynchronize both software sets, the biofuel injection system 220 may be put into the recirculation mode. The operator will then click "Lockout" on the biofuel injection screen of the HMI 310. This can reset some or all of the modes back to the original state.

By default, Unit 1 may be designated as the primary controller 320a and Unit 2 may be the backup controller 320b. The biofuel software can be designed such that if a network or controller failure is detected, the biofuel injection system 220 can go into lockout mode. The concern is during an EGD 330 network failure, the two controllers 320 cannot communicate with each other. Therefore, they do not know if the other unit is sending the remote contact command for the splitter panel 340. If the site decides to still operate on biofuel after a network failure, an operator may have to use the rotary switch on the splitter panel 340 to force the common skids 115 to communicate exclusively with either Unit 1 or 2. The software can automatically detect if they are in control of the common skids 115 from the splitter panel 340 feedback. The operator may then clear the lockout with the "Master Reset" button on the biofuel screen of the HMI 310 and then can inject biofuel on the selected unit.

If there is a planned outage on one unit and the site would like to operate on biofuel uninterrupted with the other unit, the operator may have to force the control of the common skids 115 to the operating unit. This can be done by using the rotary switch on the splitter panel 340. For example, if Unit 1 has a planned outage coming up, the operator can utilize the switch on the splitter panel 340 by rotating the knob towards "Unit 2". This can prevent Unit 2 from locking out when TCP #1 turns off. This switch can take priority over what the software determines to be the primary controller. If the rotary switch on the splitter panel 340 is left in Unit 1 in control, then the software may stay in Unit 1 control even if a network failure is detected. In certain instances, it is not recommended to utilize this switch unless the operator knows that either Unit 1 or 2 controller will be down for maintenance. During normal biofuel operation, the switch can be left in "Off" position.

The biofuel heater 120 may be controlled by a local SCR (splitter control relay) panel 410. The heater 222 may turn on when the biofuel flow measured is above about 40 GPM and a biofuel inlet thermocouple is less than about 75° F. This inlet thermocouple can monitor the temperature of the B100 flowing from the storage tank into the heater skid. If biofuel inlet thermocouple is greater about 75° F. for 30 minutes and the energy saving mode is selected on the HMI Screen, then the heater and the pumps may turn off. These signals may then be transmitted from the SCR panel 410 to the splitter panel 340 along with other devices.

To start injecting biofuel, biofuel heater outlet thermocouple may be greater than about 70° F. The temperature of the B100 biofuel leaving the heater may be measured by this thermocouple. If the temperature measurement of the same thermocouple goes above about 100° F. then a high alarm may be issued. The same may be done for temperatures less than about 60° F. If the temperature goes above about 125° F., then a high alarm may be issued.

From a controls point of view, the biofuel filtration skid 130 may be the same as the liquid fuel filtration skid 150 with the exception of two backwash solenoid valves. The filtration skid may house two self-cleaning filters (SCF) to allow backwash on one filter while operating on the other to reduce down time. The filter transfer process may be initiated when differential pressure across the filter houses is greater than about 5 psid for about 5 seconds. The controller may then send the SCF equalization solenoid valve a command signal to open. Once the pressure measured is less than about 5 psid, then SCF transfer valve may be energized to move the transfer valve to the idle filter. Once completed, a signal may be sent to close the valve. Either backwash solenoid valves and/or drain solenoid valves may now open to backwash the idle filter. After about 5 minutes, the backwash valves may close and the filtration system is now ready for another filter transfer.

During biofuel injection, only one pump on the pumping skid 140 may be needed per gas turbine. When Unit 1 is injecting biofuel, biofuel pump-1 may be turned on. When Unit 2 is injecting biofuel, biofuel pump-2 may be turned on. The third pump can, in certain instances, be only utilized for "recirculation mode" and as a backup pump. When a pump failure is detected, an alarm may be sent. This may lockout the pump until the problem is resolved and the operator clicks "Reset" on the biofuel injection screen of the HMI 310.

Before starting the biofuel system on the recirculation mode, the inlet pressure should indicate biofuel pump skid 140 inlet pressure to be greater than about 0 psi. During operation, if the inlet pressure drops below about 0 psi then an alarm will be issued. If it drops below about −5 psi for about 5 seconds then a biofuel system lockout may be issued to protect the pumps 226. If the outlet pressure goes above about 220 psig for about 5 seconds then a lockout may be issued. If the outlet pressure goes above about 210 psig for about 5 seconds, a high pressure alarm may be sent. A low outlet pressure alarm may be sent if the outlet pressure drops below about 35 psig for about 5 seconds.

The amount of biofuel injection needed can be based on a volumetric calculation with the distillate flow rate. The distillate flow rate can be measured. The maximum can be selected from the two measurements then multiplied by about 4.36 to convert from distillate pulse rate percentage to distillate flow rate in GPM (gallons per minute). That value is then multiplied by the blend ratio to calculate the volumetric flow rate needed for biofuel injection. To regulate the biofuel flow, there is a flow meter 229 that can calculate the actual biofuel flow out of the injection skid 150. The stop valve can be commanded open when the biofuel system is on injection. The biofuel system may enter "recirculation mode" if the biofuel flow is greater than B20 for about 5 seconds. This may prevent damage from occurring to the combustion hardware.

The biofuel heater screen may display the status of two skids (heating 120 and filtering 130). This screen may not provide the operator with commands for the biofuel system, but may allow the operator to know which manual valves are open and if the heater is operating or in standby. The filtering skid 130 can display the status of each solenoid valve and the transfer valve. The bottom left of each outline box can have a green box that says "TG11 in Control". This is a status box to indicate which unit is in control of the common skids 115. If the biofuel software running in parallel with the other controller becomes unsynchronized, the bottom left status box can turn red.

The commands for the biofuel injection system 220 may be located on the injection skid 150. This screen may include representations of the pumping skid 140 and the injection skid 150. The status of each pump 226 and the pressure measurements may be shown on the left side of the screen. The injection side may display the status of the bypass valve, stop valve, and the flow meter. The start and stop commands can be sent from this screen along with the blend ratio selection. The biofuel injection system 220 may be started by clicking the start button once all of the "biofuel recirc start permissives" are green. Then the operator may have to wait, for example, for about two minutes, for the recirculation to complete. Once finished, the operator can then select a suitable blend ratio near the top side of the screen once all of the "biofuel injection start permissives" are green. The transfer button can transfer the control of the common skids 115 to the other unit. This may, in certain instances, only be completed when the biofuel system is not injecting biofuel and the biofuel software should be synchronized with the other unit.

Figure 4:
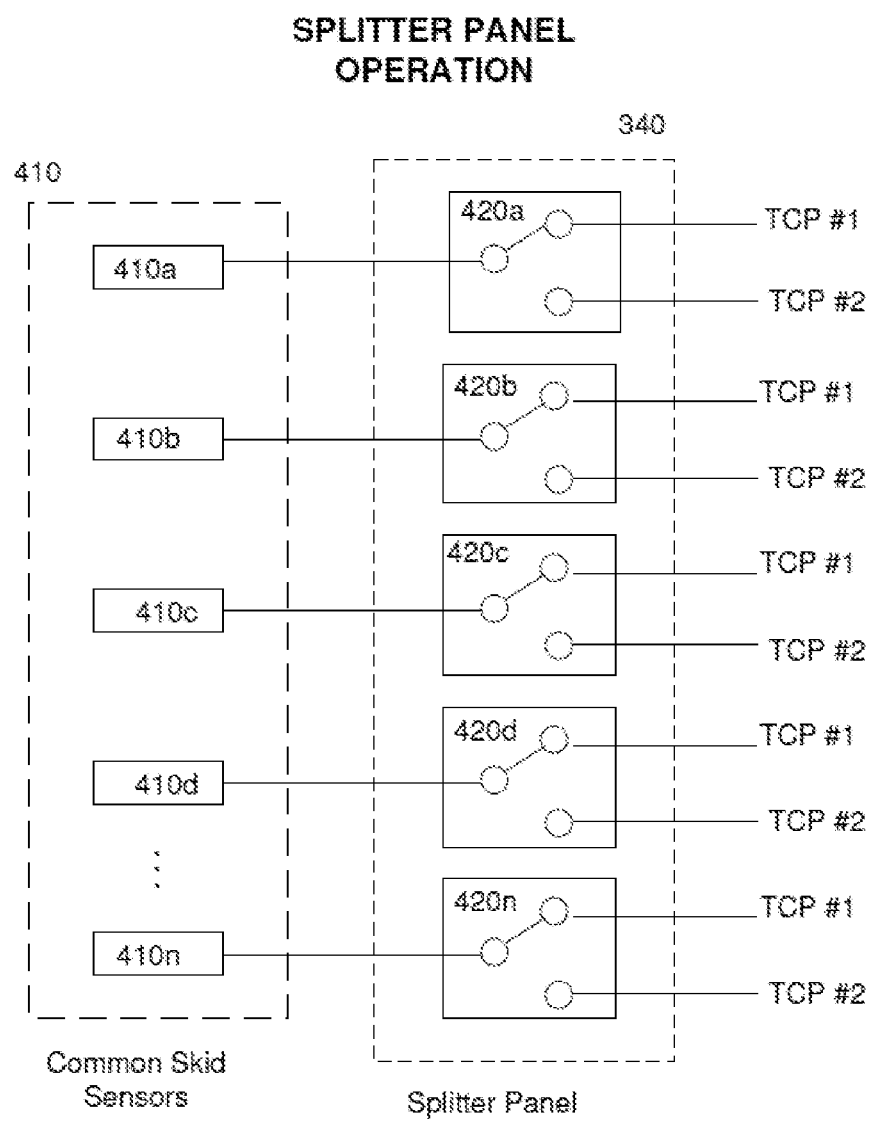
FIG. 4 is a schematic representation of an exemplary splitter panel according to certain embodiments of the disclosure.

FIG. 4 is a schematic representation of an exemplary splitter panel 340. This equipment 340 delivers IO signals to whichever unit is in control of the biofuel injection system 220. The splitter panel 340 can include relay clusters 420*a*-*n* for the discrete devices and commands. These relays can forward signals to Unit 1 if the remote contact from TCP-1 320*a* is energized. These hardware components are duplicated for Unit 2. The local rotary switch on the splitter panel 340 can be used to force the splitter panel 340 into Unit 1 in control or Unit 2 in control. For remote control from either unit, the switch can be left in the middle position which allows the remote contact to be energized from either unit. There may be DC power supplies included in the splitter panel 340 for the analog signals. This may allow the thermocouples, pressure transmitters, differential pressure transmitters to be connected to both control panels 320 instead of toggling between the two control panels like the discrete signals.

Some or all of the device sensors 410*a*-*n* within the heating 120, filtration 130, and pumping skids 140 can be wired to the splitter panel 340. This can include the heater and solenoid commands. For redundancy, the biofuel pump enable command for pump #1 and pump #2 can be wired through the splitter panel 340. Pump #1 can receive power from MCC-1 and pump #2 will receive power from MCC-2. Pump #3 is the common pump which may receive power from the customer MCC with the pump command coming from the splitter panel 340. Therefore, pump #3 can be controlled from either Unit 1 or Unit 2. The injection skids can be wired directly to their own corresponding turbine control panel 320. The pump motor status feedbacks may be wired in the same manner.

For every single device that is wired to the splitter panel 340 from the common skids 115 there can be two outputs going to Unit 1 and Unit 2. If Unit 1 is in control of the common skids 115, then the relays within the splitter panel 340 may forward all of the signals to Unit 1. The interconnect layout is the same for commands except the signal flows in reverse. Both units can have the ability to send the biofuel heater enable command but the splitter panel 340 may only listen to the unit in control.

The example systems and architectures shown in this detailed description are provided by way of example only. Numerous other operating environments, system architectures, and device configurations are possible. Further, operations may be performed in any order or omitted. Accordingly, embodiments of the present disclosure should not be construed as being limited to any particular operating environment, system architecture, or device configuration.

This written description uses examples to disclose certain embodiments of the disclosure, including the best modes, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

That which is claimed:

1. A method for injecting biofuel into a gas turbine system, comprising:
   receiving, from a controller, first blend information associated with a first gas turbine having a first gas turbine control panel;
   receiving, from the controller, second blend information associated with a second gas turbine having a second gas turbine control panel;

providing one or more fuel injection commands to a single common skid to provide a first blend of biofuel to the first gas turbine and a second blend of biofuel to the second gas turbine, the first blend of biofuel having a different blend ratio of biofuel to distillate than the second blend of biofuel, wherein the one or more fuel injection commands are selectively routed by a splitter control panel, and the one or more fuel injection commands are provided by the splitter control panel to a primary control panel selected between the first gas turbine control panel and the second gas turbine control panel;

updating a secondary control panel, selected between the first gas turbine control panel and the second gas turbine control panel, with the one or more fuel injection commands issued by the primary control panel;

transferring control of the single common skid from the primary control panel to the secondary control panel; and providing the first blend of biofuel to the first gas turbine concurrently with the second blend of biofuel to the second gas turbine.

2. The method of claim 1, wherein the single common skid comprises a heating skid, a filtration skid, and a pumping skid shared by the first gas turbine and the second gas turbine.

3. The method of claim 1, wherein transferring control comprises toggling a plurality of relays housed in the primary control panel.

4. The method of claim 1, further comprising monitoring operational parameters during injection of biofuel into the gas turbine system.

5. The method of claim 4, wherein failure of an operational parameter results in an automatic shutdown of a biofuel injection system without interfering with a regular operation of the gas turbine system operating on liquid fuel.

6. The method of claim 1, further comprising transferring control from the primary control panel to the secondary control panel while the first gas turbine and the second gas turbine are operating.

7. The method of claim 6, further comprising switching control to the secondary control panel during startup or shut down of the first gas turbine and the second gas turbine.

8. The method of claim 1, further comprising maintaining the secondary control panel in a same state as the primary control panel.

9. The method of claim 8, wherein commands from the secondary control panel to the single common skid are not executed by a biofuel injection system except for those commands issued to a pump associated with the secondary control panel on a pump skid.

10. The method of claim 9, wherein the primary control panel and the secondary control panel are coupled via a communication data protocol that provides signals to maintain the secondary control panel in the same state as the primary control panel.

11. A system for injecting biofuel into a gas turbine system, comprising:
a controller operable to execute stored commands, the commands are operable to:
receive, from a controller, first blend information associated with a first gas turbine having a first gas turbine control panel;
receive, from the controller, second blend information associated with a second gas turbine having a second gas turbine control panel;
provide one or more fuel injection commands to a single common skid to provide a first blend of biofuel to the first gas turbine and a second blend of biofuel to the second gas turbine, the first blend of biofuel having a different blend ratio of biofuel to distillate than the second blend of biofuel, wherein the one or more fuel injection commands are selectively routed by a splitter control panel, and the one or more fuel injection commands are provided by the splitter control panel to a primary control panel selected between the first gas turbine control panel and the second gas turbine control panel;
update a secondary control panel, selected between the first gas turbine control panel and the second gas turbine control panel, with the one or more fuel injection commands issued by the primary control panel;
transfer control of the single common skid from the primary control panel to the secondary control panel; and
provide the first blend of biofuel to the first gas turbine concurrently with the second blend of biofuel to the second gas turbine.

12. The system of claim 11, wherein the single common skid comprises a heating skid, a filtration skid, and a pumping skid shared by the first gas turbine and the second gas turbine.

13. The system of claim 11, wherein the commands operable to transfer control further comprise commands operable to toggle a plurality of relays housed in the primary control panel.

14. The system of claim 11, wherein the commands are further operable to monitor operational parameters during injection of biofuel into the gas turbine system.

15. The system of claim 14, wherein failure of an operational parameter results in an automatic shutdown of the biofuel injection system without interfering with a regular operation of the gas turbine system operating on liquid fuel.

16. The system of claim 11, wherein the commands are further operable to transfer control from the primary control panel to the secondary control panel while the first gas turbine and the second gas turbine are operating.

17. The system of claim 16, wherein the commands are further operable to switch control to the secondary control panel during startup or shut down of the first gas turbine and the second gas turbine.

18. The system of claim 11, wherein the commands are further operable to maintain the secondary control panel in a same state as the primary control panel.

19. The system of claim 18, wherein commands from the secondary control panel to the single common skid are not executed by the biofuel injection system except for those commands issued to a pump associated with the secondary control panel on a pump skid.

20. The system of claim 19, wherein the primary control panel and the secondary control panel are coupled via a communication data protocol that provides signals to maintain the secondary control panel in a same state as the primary control panel.

* * * * *